Figure 16:
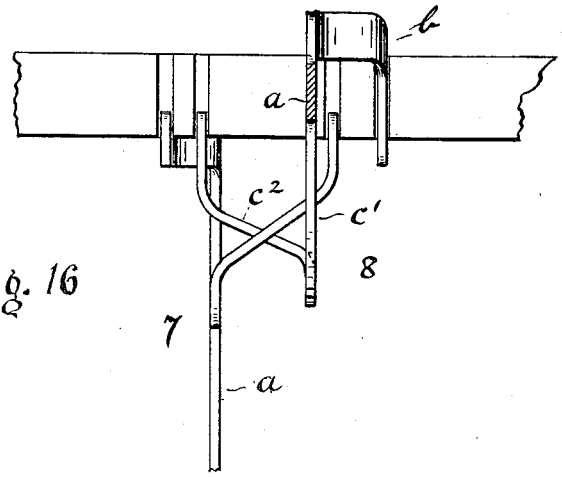

W. H. HULSE.
TYPE WRITING MACHINE.
APPLICATION FILED JULY 9, 1904.
1,086,054. Patented Feb. 3, 1914.
2 SHEETS—SHEET 1.
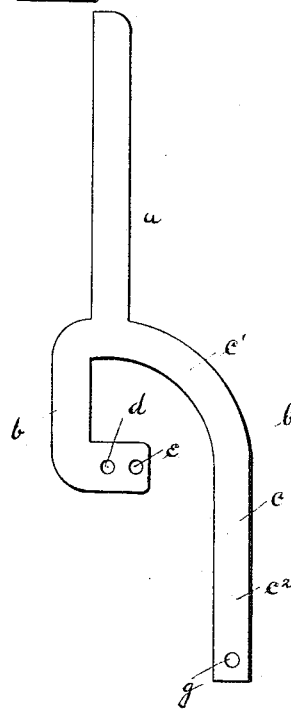
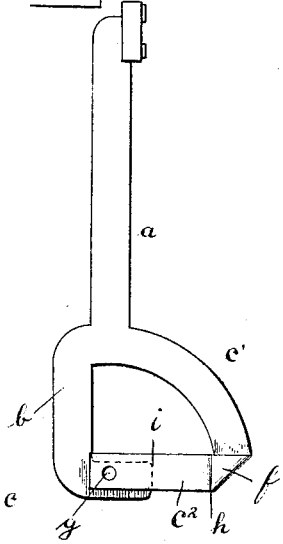
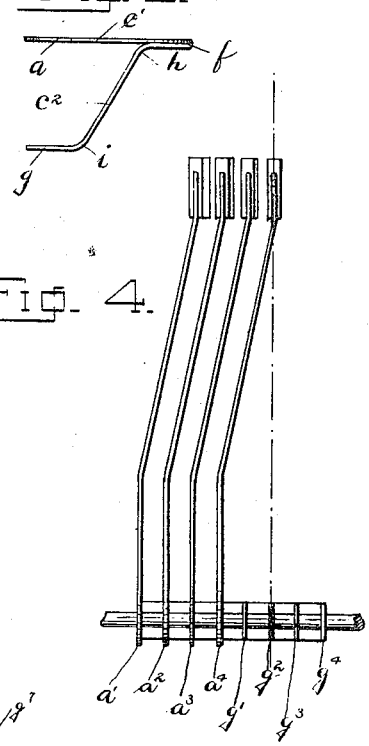
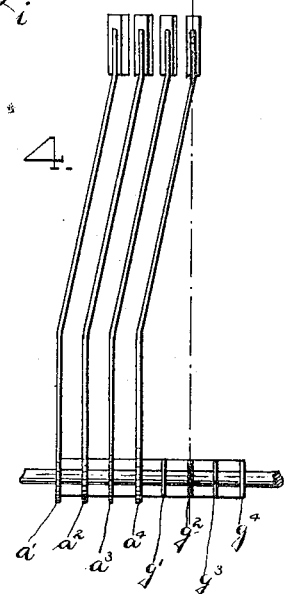
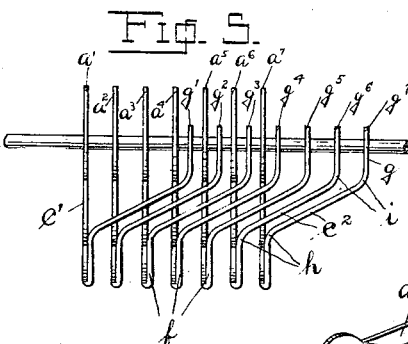
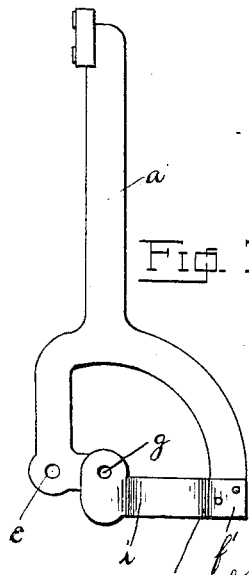
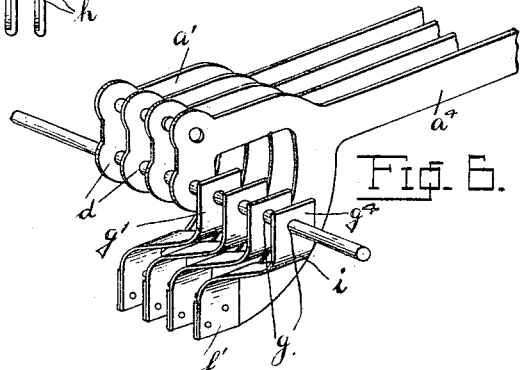
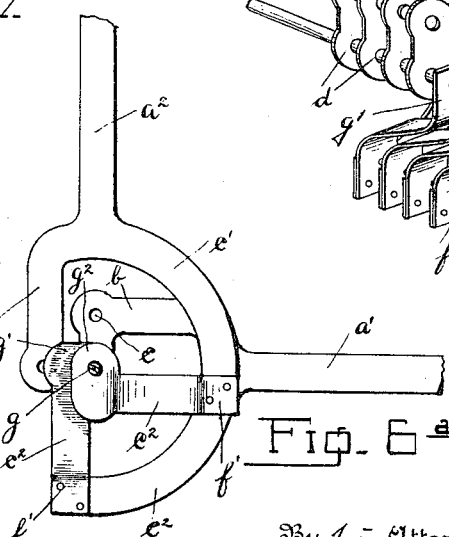
Witnesses
S. J. Hoester
Elias Goldberg
William H. Hulse
Inventor
By his Attorneys
Knight Bros

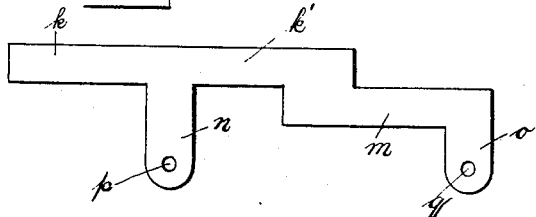
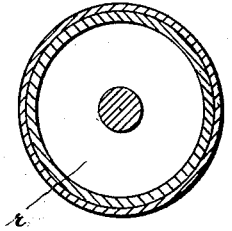
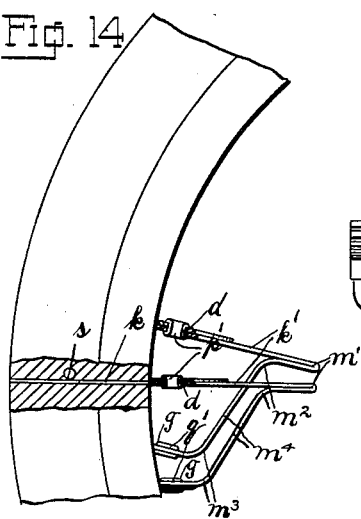
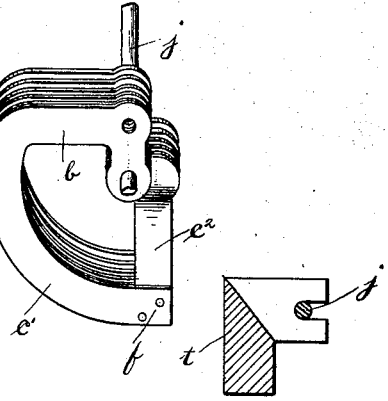
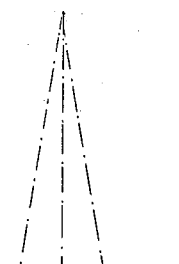
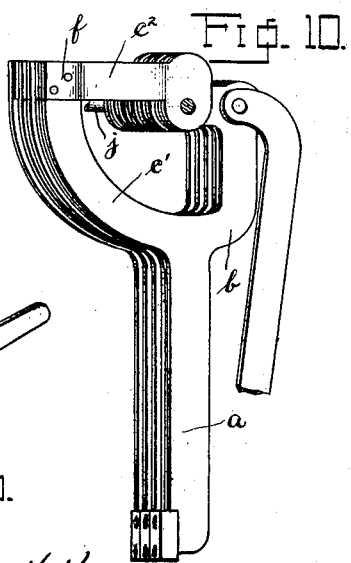
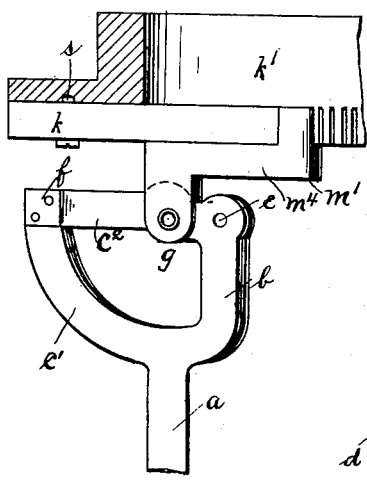
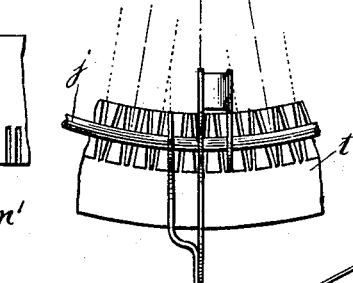

UNITED STATES PATENT OFFICE.

WILLIAM H. HULSE, OF MONTREAL, QUEBEC, CANADA, ASSIGNOR TO VICTOR TYPEWRITER COMPANY, OF NEW YORK, N. Y., A CORPORATION OF NEW YORK.

TYPE-WRITING MACHINE.

1,086,054.  Specification of Letters Patent.  Patented Feb. 3, 1914.

Application filed July 9, 1904. Serial No. 215,963.

*To all whom it may concern:*

Be it known that I, WILLIAM H. HULSE, a citizen of the United States, residing at Montreal, in the Province of Quebec and Dominion of Canada, have invented certain new and useful Improvements in TypeWriting Machines, of which the following is a specification.

My invention relates to typewriting machines and has for its object to obtain an improved form of type-bar and arrangement of mounting the same whereby long or extended bearings for each bar are secured resulting in great lateral rigidity of the bars, and, at the same time, a full set of type-bars are accommodated in the limited segmental or circular space available for their bearings or fulcrum supports.

The invention possesses special value for " front-strike " or other " visible writing " machines wherein the space available for mounting the bars is limited; but the invention is also valuable in under-strike or " basket " machines.

In carrying out my invention I provide a type-bar with a bifurcated and laterally-branching heel by which it is pivoted at two fulcrum points located at some distance asunder and preferably on each side of the plane of oscillation of the bar; the construction being such as to permit the overlapping of the branched fulcrum-heels of several adjacent type-bars, without interfering with their independent motion. The invention thus provides a lateral brace for the respective bars of ample extent while they are mounted within very close compass.

In practice the entire range of type-bars may be mounted on a common wire, curved concentrically with the common printing point, the pair of fulcrum cheeks of each type-bar-heel working in guiding slots or kerfs in the frame, in planes parallel with the plane of oscillation of the type-bar to which they belong, as hereinafter described.

The invention further embraces the application of the same principle of construction to type-bar hangers whereby widely separated pivot-attachments are provided for the bifurcated type-bar-heel, with a single shank for mounting the hanger adjustably in the frame of the machine.

The special value of the invention in its application to front-strike machines results in part from the necessity of assembling the full set of forty or more bars approximately three inches in length, within an arc of about 120° in front of the platen. It results that in front-strike machines especial difficulty exists in providing for the type-bars bearings of sufficient length to afford lateral rigidity. Cheek plates or washers are employed to supply this deficiency in type-bars of common form, but these cause increased friction as well as difficulty in fitting. By forming the respective type-bars with bifurcated heels each adapted to overlap three, more or less, of its neighbors I provide great lateral rigidity with a minimum of friction and by my special construction of such overlapping arms or branches I adapt them to turn in arcs of 90 degrees without mutual or relative interference so as not to obstruct the free and independent movement of the typebars. According to my invention a full set of type-bars may be assembled and mounted in such a manner that their axes of movement, or the line joining the two fulcrum points of each bar, form chords of a circle. Each chord overlaps a portion of a plurality of the chords formed by adjacent bars. By this arrangement, I attain at once long bearing bases for the bars as well as accommodation for a full set of type-bars within the limited space available for the same in visible writing machines. By the new form of construction of type-bar which I have invented, I am enabled to secure the above results without in any way interfering with or impairing the freedom of individual movement of any bar.

A further feature of advantage secured by my invention consists in the homogeneous character of the type-bars. Thus all the type-bars may be of uniform length and constitute a homogeneous set. With other forms of type-bars with which I am acquainted and in which it has been attempted to provide long or extended bearing bases for the bars, it has been necessary to have bars of different lengths mounted at different radial distances from the printing center; or to vary the form of the type-bar according to the position it is to occupy in the set or basket, or to arrange the bearings askew, in order to find accommodation for complete set of bars. In a machine embodying my invention all these expedients become unnecessary; the bars may be uniform in construction and the bearings so arranged as to equalize the wear and avoid undue friction. My invention does not preclude, however, the employment of type bars of different lengths if such a construction be desired but all the advantages thereof may be obtained in such a construction.

The invention also relates to other details of construction which will be defined in the claims.

Figure 17:
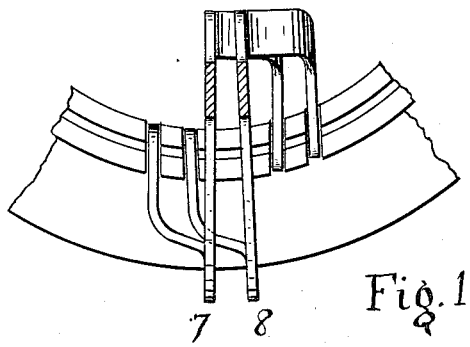
Figure 18:
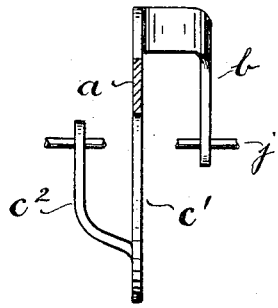

In the accompanying drawings, Figure 1 is a view of a blank from which the improved type-bar may be made in one piece of metal. Fig. 2 is a side view of a type-bar formed from such blank. Fig. 3 is an end view of the heel of the type-bar. Fig. 4 is a diagrammatic plan view of a number of improved type-bars assembled on a straight wire. Fig. 5 is an end view of the same. Fig. 6 is a perspective view of the same. Fig. 6$^a$ is a side view of two adjacent type-bars in their different positions. Fig. 7 is a side view illustrating a modification in which a type-bar also embodying my invention is made in two pieces. Fig. 8 is a perspective view of the bar shown in Fig. 7, and illustrating a further modification. Fig. 9 is a perspective view of a number of such bars assembled as for a front-strike machine. Fig. 10 is a perspective view showing a number of bars as assembled for a bottom-strike or basket machine. Fig. 11 is a diagrammatic view of a number of the type-bar-heels and a portion of the frame illustrating the mode of mounting the fulcrum cheeks of each type-bar in paired guide kerfs parallel with the plane of oscillation of the type-bar to which they belong. Fig. 12 is a transverse section of the supporting frame. Fig. 13 is a plan view of a blank for the formation of a hanger suitable for the improved type-bars. Fig. 14 is a plan view (parts being in section) showing a plurality of hangers and portions of the type bar heels mounted in position as for a bottom strike machine; Fig. 15 is a side view of Fig. 14 showing the hanger and the heel portion of a type bar. Fig. 16 is a partial plan view showing a section of the support or segment and a plurality of type-bars in overlapping relation, one type-bar being in normal position and another swung toward the printing point. Fig. 17 is a fragmentary front elevation of a pair of similar bars overlapping, both being in substantially normal position. Fig. 18 is a partial front elevation of the heel and pivots of a single bar similar to those shown in Fig. 17.

In carrying my invention into effect I prefer to form the type-bars from blanks of approximately the shape illustrated in Fig. 1. These blanks are stamped out of thin sheet metal with a body $a$, to form the shank of the type-bar and branches or arms $b$, $c$. of different length. The shorter arm $b$, is parallel with the shank $a$, but projects in front of the same and at its lower end extends transversely inward beyond the central longitudinal line of the shank. This transverse end has a perforation $d$, in line with the longitudinal center of the shank for the fulcrum-pivot and a second perforation $e$, for the attachment of the rod or link by which the type-bar is operated. The pull-rod aperture $e$ may be located on one side of the fulcrum aperture $d$, as shown in Figs. 1 and 2 or on the other side as shown in Figs. 6, 7 and others, according to the mode of operation in different machines. The longer arm $c$, extends from the shank $a$, in an arch or quadrant curve and at the extreme end of the quadrant is bent upon itself at right angles, as shown at $f$, in Fig. 2, and its extremity is provided with the perforation $g$, which is thus brought in line with the fulcrum perforation $d$, in the arm $b$, but removed at some distance laterally therefrom by the transverse bends $h$, $i$, shown in Fig. 3. The bar is preferably deflected as shown in Fig. 4 to bring the type end thereof to a plane approximately midway between the fulcrum extremities of the two branches. The separation between the perforations $d$, and $g$, produced by the lateral extent of the oblique portion $c^2$ of the arm between the points $h$, and $i$, is sufficient to adapt the bifurcated heel of one type-bar formed by the arms $b$, $c$, as above described, to overlap three, more or less, adjacent bars, as illustrated in Figs. 4, 5 and 6, and the arch which is formed by the curvature of the arm $c$, affords space for the heels of the adjacent bars to turn one within the other, as illustrated diagrammatically in Fig. 6$^a$. By inspection of Fig. 6$^a$ in connection with Figs. 5 and 6 it will be apparent that the arch space in each type-bar-heel bounded by the arch $c'$, affords room for the passage therethrough of the oblique arms $c^2$ of three adjacent type-bars and for the free and independent movement of such arms through an arc of 90° as the type-bars are severally operated. The same form of bifurcated heel may be produced by the making of the branch or arm $c$, in two pieces, consisting of the curve or arch shoulder $c'$, and the transverse member $c^2$, carrying the perforation $g$, which are riveted together at $f'$, as shown in Figs. 6, 7 and 8.

Fig. 8 illustrates a further modification in which the arm $b$, is deflected laterally from the shank $a$, so as to supplement the lateral deflection of the transverse member $c^2$. The two members $b$ and $c^2$ are thus turned in opposite directions whereby the long or extended bearings for the bars are obtained and the plane of oscillation of the bar is brought intermediate of its two fulcrum supports.

Figs. 4, 5 and 6 are diagrammatic representations to illustrate the manner of assembling the bars with their branching heels overlapping. For illustration I have numbered the type-bars $a^1$, $a^2$, $a^3$, $a^4$, and $a^5$, and the lateral branches thereof, each of which overlaps three adjacent bars $g'$, $g^2$, $g^3$, etc. The purpose of these diagrammatic representations is to show more clearly how the sector shaped portion of each type-bar heel is adapted to partly surround the oblique radial arms of three (more or less) adjacent type bar heels. In actual use the type bars are not parallel as shown in Figs. 4, 5 and 6, but are mounted to oscillate in planes radial to the printing point, as indicated in Fig. 11. The axis of motion of each type-bar is a chord of an arc concentric with the printing point; whether they are mounted on a common curved rod as illustrated in Fig. 11, or on separate bracket attachments, as illustrated in Fig. 14.

In practice the bars may be assembled on curved fulcrum rods $j$, as illustrated in Figs. 9 and 10, Fig. 9 showing the arrangement for a front-strike typewriter and Fig. 10 showing the arrangement for a bottom-strike or basket machine. In Fig. 9, $r$ indicates the location of the platen.

While my improved type-bar may be used as above described, by assembling the bars on a suitably curved fulcrum rod, I prefer to mount them on a hanger specially constructed for my improved type-bar, and while providing fulcrum attachments at the required distance asunder to correspond with the pivot points $d$, and $g$, of the type-bar-heel, providing simple and convenient means for adjusting the bars in proper alinement by a setting movement in line with the bar, when the latter is in striking position.

My improved hangers are constructed on the same principle as already described with reference to the type-bar-heels, and preferably from blanks of substantially the form represented in Fig. 13. This blank consists of a straight bar $k$, $k'$, to form respectively the attaching tang and the projecting shank of the hanger, and the extension $m$, forming an offset from the shank $k'$ also offset $n$, and $o$, projecting at right angles one from the junction between the tang and shank $k$ and the other from the extremity of the offset $m$, as shown. To form the bifurcated shank the offset $m$, is folded back on itself, as shown at $m'$, in Fig. 14, and bent in opposite directions at $m^2$, and $m^3$, to form the oblique transverse extension $m^4$, of sufficient length to bring the extremity of the offset $o$, correspond with the distance asunder of the fulcrum apertures $d$ and $g$ in the type-bar-heel, as shown in Fig. 14. In the offsets $n$, and $o$ are formed the fulcrum perforations $p$, and $q$, to which the arms of the type-bar shank are pivoted by hollow rivets $p'$, $q'$ passing through the fulcrum-apertures $d$ and $g$, therein. The shank $k'$ and offset $m$ being formed as shown, permit the assembling of the hangers side by side without interference, the shank $k'$ coming above the offset $m$ of the neighboring hanger or hangers. In Fig. 14, I have shown in plan view, and in Fig. 15 in vertical section, one of the arms with heel portions of the type-bar riveted thereto mounted in the curved bar of the frame suitable for a bottom-strike or basket machine. A single shank $k$, for each type-bar with its branched pivot-attachments thus affords the necessary longitudinal adjustment for setting the types in proper alinement. When set the shank is secured in adjusted position by a set-screw $s$.

The improved hanger with branched fulcrum arms as illustrated in Figs. 14 and 15 enables the location of the two fulcrum cheeks for each bar in parallel planes. When the branching heels are mounted on curved fulcrum-rods as illustrated in Figs. 9 and 10, the fulcrum apertures are necessarily made somewhat larger than the diameter of the curved rod on which they work.

Fig. 11 illustrates in plan view the mode of mounting the two parallel fulcrumed cheeks of each type-bar in parallel kerfs in the curved fulcrum bar $t$ of the machine-frame. This diagram indicates in dotted lines, the several planes, radial to the common printing point, in which the type-bars move, the two fulcrum kerfs of each type-bar, being parallel to each other and to the plane, of the oscillation of the type-bar to which they belong.

From the foregoing description of the invention it will be seen that a type bar embodying the same includes the type-carrying stem or shank $a$, which is bifurcated at its fulcrum or bearing end, the branches of said bifurcation separating or diverging in two general directions, viz: said branches $b$ and $c$ diverge in a general direction transversely of the axis of movement of the bar, as clearly seen when the bar is viewed from the side, as in Figs. 2, 6, 8, 9, 10 and 15 and other figures, wherein the arms or branches $b$ and $c'$ appear as separated or divergent in a direction transverse to the axis represented by the pivotal bearing $j$, or the fulcrum or pivotal perforations $d$ and $g$. The branches $b$ and $c$ or $c'$ also diverge in a lateral direction or in line with the pivotal axis, as clearly shown in Figs. 4, 5, 6, 8 and 11, where the extremities of the two branches The form of the branches, as shown and described, are such as to provide a clearance for the branches or arms of adjacently mounted bars to provide for the free and independent movement of any bar in the series without interference or collision with other bars. In the arrangement or mounting of the bars the branches or pivotal arms are in internested relation, as may be seen in Figs. 5, 6, 16 and 17, where the corresponding arms or branches $c^2$ are nested adjacently as are also the arms $a'$. It will be further seen from the same views that the laterally extending arms of a given bar extend across from one side to the other of the plane or planes of movement of an adjacent bar or bars; thus in Figs. 5 and 6 for example, the lateral arm $c^2$ of the first bar on the left extends from the left side of the second or adjacent bar across to the right side of said second bar, and in fact crosses the planes of movement of the three next adjacent bars.

Having thus described my invention, the following is what I claim as new therein, and desire to secure by Letters Patent:—

1. In a typewriting machine, a set of pivotally mounted and independently movable type bars, a pair of spaced-apart pivotal bearings for each bar, the axes of movement of said bars being chords of the same circle, said chords overlapping one another.

2. In a typewriting machine, a set of pivotally mounted independently movable type-bars, a single segmental or arc-shaped bearing support for said bars, a pair of spaced-apart bearings on said support for each of said bars, the axes of movement of said bars being chords of said segment or arc, said chords overlapping one another.

3. In a typewriting machine, a set of pivotally mounted independently movable type-bars, two laterally separated pivotal supports for each bar, all said supports in substantially the same plane and at substantially uniform distance from the printing center of the machine, and single pivotal supports of the said set of bars adjacently succeeding one another in the same order of arrangement as the bars to which they respectively belong.

4. A typewriting machine having two spaced-apart pivotal bearings for each type-bar, said pivotal bearings arranged on the arc of a common circle, the angular distance between the two bearings of each type-bar being greater than the quotient of the whole arc occupied by all the bars, divided by the number of type-bars.

5. In a typewriting machine, a set of type-bars, a pair of spaced-apart pivotal supports for each bar, the lines joining each pair of said supports forming overlapping chords of a common circle, and each type-bar having an arched or curved member forming a clearance for the overlapping portions of adjacent bars.

6. A typewriting machine having a pair of fulcrum supports or bearings for each type-bar, with members of one or more pairs intervening between the members of another pair of supports, said fulcrum supports or bearings situated at a uniform distance from the printing center of the machine, means for adjusting said bearings, each type-bar having an arched or curved member and lateral branches extending in opposite directions from the ends of the arched member, said branches pivoted in a pair of said fulcrum supports or bearings.

7. A type-bar for typewriting machines, having a type-carrying shank, said shank bifurcated at its fulcrum end, the branches of said bifurcated end being divergent one from the other in a direction transversely of the axis of movement of the bar and also divergent one from the other in the line of said axis.

8. A type bar for typewriting machines, said bar having a shank adapted to carry the type at one end thereof and having its other end formed in two branches, said branches laterally separated and deflected in opposite directions from the line of the shank and also deflected one from the other in the direction of movement of the type bar to form an operating clearance for the branches of associated bars, the ends of said branches being parallel with one another and intersected by the axis of movement of the bar.

9. A type-bar for typewriting machines, having a single type-carrying shank bifurcated at one end to form fore and aft branches terminating in oppositely turned and laterally separated fulcrum-extensions through which passes the axis of rotation of the bar.

10. A type-bar for typewriting machines, having a single type-carrying shank provided with a fore and aft arched fulcrumed heel having laterally separated fulcrumed extensions oppositely turned and intersecting the axis of rotation of the bar.

11. A type-bar for typewriting machines, having a single shank, said shank carrying the type at one end thereof and having its other end formed in two branches, one of said branches having an arched portion extending transversely of the axis of movement of the bar, and the extremities of said branches forming laterally separated fulcrumed connections for the bar.

12. In a typewriting machine, a set of type-bars pivotally mounted in a single arc, each bar having a type-carrying shank, said shank having its pivotal end formed in two branches, said branches divergent in a direction transverse of the pivotal axis of the bar and also divergent in a direction in line with said axis, and branches of adjacent bars intervening between said branches.

13. In a typewriting machine, a series of type-bars, each bar having a type-carrying shank and a bifurcated heel, one branch of said heel consisting of a sector-shaped portion and extending in a direction transversely of the axis of movement of the bar and having a laterally offset extension, a fulcrumed portion on the other branch of the heel in parallelism with and opposite to the extremity of said extension, the sector-shaped portion and its offset extension being adapted to overlap similar parts of one or more adjacent bars.

14. In a typewriting machine, a plurality of type-bars each of said bars provided with a bifurcated fulcrum end, each branch of which is supported on a suitable bearing support, said bars mounted adjacent one another with the branches of one bar bridging branches of adjacent bars and forming a clearance to permit the operation of any individual bar without interference with other bars.

15. A type-bar for typewriting machines, having a shank, an arched portion, and two laterally separated branches extending from the arched portion, said arched portion curved in a plane substantially radial to the printing center of the machine, and a fulcrum support for each of said branches.

16. A type-bar for typewriting machines, having a shank, an arched member extending therefrom in the plane of oscillation of the type bar, laterally separated extensions branching from each end of said arched member, two spaced-apart fulcrum supports, each of said extensions having pivotal connection with a fulcrum support.

17. A type-bar for typewriting machines, having a shank, an arched member extending therefrom in a plane substantially at right angles to the axis of movement of the bar, and oppositely disposed members extending from the ends of the arched member, said oppositely disposed members having pivotal connections with the fulcrum supports of the bar.

18. In a typewriting machine, the combination with a pair of bearings, adjusting means for said bearings, a type-bar having a shank, an arched member extending from the shank and in a plane substantially at right angles to the axis of movement of the bar, laterally separated fulcrum extensions from the ends of said arched member, each of said extensions having pivotal connection with one of said bearings.

19. In a typewriting machine, a series of adjacently mounted type-bars, each bar having a bifurcated fulcrum heel, the bifurcation of one bar spanning single heel members of one or more adjacent bars, said bifurcation having a curvilinear portion to clear the heel members of adjacent bars and permit free movement of any of the bars.

20. In a typewriting machine, the combination of a set of type bars, each bar having its fulcrum end bifurcated, one of said bifurcations having an arched shaped portion, said arched shaped portion being substantially at right angles to the axis of movement of the bar, bearings for the type bars arranged in pairs the members of each pair of bearings being spaced apart and overlapping members of adjacent pairs, and each pair pivotally supporting a type-bar.

21. A typewriting machine comprising a series of type-bars, each bar formed with a single type-carrying shank and two laterally separated branches with an arch-shaped portion joining the two branches, two fulcrum supports for each bar, each support having pivotal connection with one of said branches, the line joining the fulcrum points of the two supports of each bar forming a chord of a circle whose center is the printing center of the machine, said arch-portion of one type bar embracing or partly surrounding branches of adjacent type-bars.

22. A type-bar for typewriting machines having a fulcrum heel formed in two branches provided near their extremities with fulcrum connections, one of which branches is curved concentrically with the axis of motion and is provided with an obliquely deflected fulcrum connection whereby the two fulcrum connections are in line with said axis at some distance asunder.

23. In a typewriting machine, a plurality of type-bars, each bar having a single shank and formed at its fulcrum end in two branches, one of said branches curved in substantially quadrant form in the part adjacent the shank and having a laterally and obliquely deflected extension, said extension passing within the curved portion of adjacently mounted type-bars, and fulcrum connections with the ends of said branches whereby the curved portion of said bar forms a clearance to permit free and independent movement of the bar.

24. The combination of a type-bar having a fulcrum heel formed in two branches providing parallel fulcrum connections at some distance asunder; and a hanger therefor formed with two fulcrum connections corresponding in position with the separate fulcrum connections of the type bar heel, and a single shank permitting the adjustment of the hanger in a direction in line with the type bar when in striking position, substantially as described.

25. The combination of a plurality of type-bars having branching and overlapping fulcrum heels forming two separate fulcrum connections for each type-bar, and hangers therefor, each formed with separate fulcrum connections corresponding in position with the separate fulcrum connections of the type-bar heel and with a single shank to facilitate the adjustment of the type bar in direction of their length, substantially as described.

26. A type-bar for typewriting machines, having a type-carrying shank diverging at its fulcrum end into two branches one of said branches being substantially straight and in the same direction as the shank and the other of said branches extending in a curved line away from the shank, pivotal connections at the ends of said branches, said curved portion forming a clearance for branches of adjacent bars, and situated between the pivotal connection and the shank.

27. A typewriting machine having type-bars, said type bars having bifurcated fulcrum ends, a pair of spaced-apart pivotal bearings for the bifurcated end of each bar, the axes of movement of the bars forming chords of a circle with said pivotal bearings forming the extremities of each chord, said chords overlapping one another and normal to the plane of movement of the bars.

28. A typewriting machine having type bars, said type bars having bifurcated fulcrum ends, a pair of spaced-apart pivotal bearings for the bifurcated end of each bar, the axes of movement of said bars forming chords of a circle on the circumference of which said pivotal bearings are situated, said chords intersecting one another between their pivotal bearings.

29. A type-bar comprising a body portion and arms which first extend away from each other in the plane of rotation of the type-bar and then extend toward the pivotal axis of the type-bar.

30. A type-bar comprising a body portion and arms which first extend away from each other in the plane of rotation of the type bar and then extend toward the pivotal axis of the type bar and away from the plane of rotation of the type-bar.

31. In a typewriting machine, the combination of a series of hangers, and a series of type bars mounted therein, each type bar comprising a body portion and arms provided with pivot seats and each type bar being interposed between another type bar and one of the pivot seats of the latter.

32. In a typewriting machine, the combination of a type bar support, and a series of type bars pivotally mounted thereon, each of said type bars being forked at its pivotal end to form an upper and a lower arm, the upper arm of said fork being inclined downwardly and laterally in one direction to its pivotal point, and the lower arm of said fork being inclined upwardly and laterally in the other direction to its pivotal point, and the upper arms of the several type bars being nested above their pivotal points and the lower arms of said type bars being nested below their pivotal points.

33. In a typewriting machine, the combination of a type bar support, and a series of type bars pivotally mounted thereon, each of said type bars being forked at its pivotal end to form an upper and a lower arm, the upper arms of the several type bars being inclined laterally in one direction and the lower arms of the several type bars being inclined laterally in the opposite direction and the series of upper arms being disposed in nested arrangement and the series of lower arms being disposed in nested arrangement.

34. In a typewriting machine, the combination of a type bar support, and a series of type bars pivotally mounted thereon, each of said type bars being forked at its pivotal end to form two arms, one of which extends laterally in one direction and the other of which extends laterally in the opposite direction, said arms being pivoted to said support at their ends and the pivotal points of the two arms of any type bar being spaced a distance apart greater than the distance from one type bar to the next in the series.

35. In a typewriting machine, the combination of a type bar support, and a series of type bars pivotally mounted thereon, each of said type bars being forked at its pivotal end to form an upper and lower arm, one of which is bent laterally from the type bar in one direction and the other of which is bent laterally from said type bar in the other direction, said upper arm being curved from the type bar rearwardly, laterally and downwardly to its pivotal end and said lower arm being curved from said type bar rearwardly, laterally and upwardly to its pivotal end.

36. In a typewriting machine, the combination of a type bar support, and a series of type bars pivotally mounted thereon, each of said type bars being forked at its pivotal end to form an upper and a lower arm, said upper arm being bent laterally from the type bar in one direction and said lower arm being bent laterally from said type bar in the opposite direction, said upper arm lying in part below the corresponding arm of the next type bar in the series on that side adjacent said upper arm and over the corresponding arm of the next type bar on the other side and said lower arm lying in part above the corresponding arm of the next type bar in the series on the side adjacent said lower arm and below the corresponding arm of the next type bar on the other side.

37. In a typewriting machine, the combination of a type bar support, and a series of type bars pivotally mounted thereon, each of said type bars being forked at its pivotal end to form an upper and a lower arm, each of said arms being pivoted at its end to said support, all of said upper arms being inclined laterally from their type bars toward their pivotal ends in the same direction and all of said lower arms being inclined laterally from their respective type bars to their pivotal ends in the other direction whereby said upper arms are disposed in nested arrangement and said lower arms are disposed in nested arrangement.

38. In a typewriting machine, the combination of a series of pairs of pivotal supports, a series of type-bars mounted on said supports, each bar having its pivotal end formed of two branches, said branches divergent in the direction of movement of the bar and also divergent in the direction of the axis of movement of the bar, and the branches of each bar mounted on one of said pairs of pivotal supports, and in internested relation with branches of adjacent bars, and the similarly directed and corresponding branches successively adjacent one another in the same order of succession as the bars to which they belong.

39. In a typewriting machine, the combination of a series of adjacently-mounted type-bars, each of said bars having two pivot-arms or branches divergent one from the other, a series of pivotal supports on which said pivot arms are mounted, the arms of the several bars in internested relation, with one of the pivotal arms of an individual bar passing across from one side to the other of the plane of movement of one or more adjacent bars.

WILLIAM H. HULSE.

Witnesses:
M. BLANCHARD,
OLIVER DOWNING.